(12) United States Patent
Melochick et al.

(10) Patent No.: US 12,032,151 B2
(45) Date of Patent: Jul. 9, 2024

(54) NIGHT VISION SYSTEM

(71) Applicants: Jeffery Melochick, Raymond, NH (US); Nicholas Berube, Methuen, MA (US)

(72) Inventors: Jeffery Melochick, Raymond, NH (US); Nicholas Berube, Methuen, MA (US)

(73) Assignee: Nocturn Industries LLC, Exeter, NH (US)

( * ) Notice: Subject to any disclaimer, the term of this patent is extended or adjusted under 35 U.S.C. 154(b) by 126 days.

(21) Appl. No.: 17/866,314

(22) Filed: Jul. 15, 2022

(65) Prior Publication Data

US 2023/0152569 A1 May 18, 2023

Related U.S. Application Data

(60) Provisional application No. 63/221,977, filed on Jul. 15, 2021.

(51) Int. Cl.
*G02B 23/12* (2006.01)
*G02B 23/18* (2006.01)

(52) U.S. Cl.
CPC ............. *G02B 23/12* (2013.01); *G02B 23/18* (2013.01)

(58) Field of Classification Search
CPC ................................ G02B 23/12; G02B 23/18
USPC .......................................................... 359/630
See application file for complete search history.

(56) References Cited

U.S. PATENT DOCUMENTS 5,103,248 A * 4/1992 Sato ......................... G02B 7/06
359/414

* cited by examiner

*Primary Examiner* — William Choi
(74) *Attorney, Agent, or Firm* — Dan B Law PLLC; Daniel S. Bretzius

(57) ABSTRACT

A night vision system having one or more pods to permit a user to see in reduced light or evening conditions. The night vision system can include one or more pod(s) and the pod(s) can be actuatable between an "up" position and an active "down" position, wherein the pod is automatically powered and controlled when in the active position. A wearable power and/or control pack is further described, as is the use of an interpupillary stop feature.

1 Claim, 18 Drawing Sheets

NIGHT VISION SYSTEM

FIELD OF DISCLOSURE

The present disclosure relates to systems used to permit users to see in evening, night, and low light conditions. In some embodiments, the disclosure relates to night vision systems that are adapted and/or configured to be worn on or secured to a user's head or helmet.

BACKGROUND

Night vision systems have been in use since World War II, but have seen more interest and use from civilians with increased availability of recreational, sport, and entertainment activities that can be conducted at night. Night vision systems can come in many different varieties, styles, and mounts. Night vision systems that are worn on a user's head or helmet must be lightweight and appropriately configured to provide ease of use and prevent instability during use. This is particularly true in a military or law enforcement application where the user's safety and life are at risk. Rapid effective ergonomic use and low eight are critical in scenarios requiring low thought, high dexterity, ease of use, and long terra use with low fatigue.

SUMMARY

As shown and described herein, this disclosure describes and illustrates improvements to night vision systems. Some improvements disclosed herein include customizable pod actuation and features that increase stability of the night vision system when worn on a user's head or helmet. By way of example, the present disclosure describes a counterweight power or control pack that can be worn on or attached to a user's head, with said counterweight pack providing stability that minimizes inertial disturbances during movement. The improvements and inventions discussed herein provide a better user experience and increase enjoyment and use of the night vision systems.

Additional advantages and details are also described herein with reference to the provided drawings. Some embodiments of night vision systems may incorporate only one of the improvements discussed herein, while other embodiments may include a combination of such improvements. Embodiments of the night vision system are not restricted to the examples illustrated in the drawings, as, due to the number of possible embodiments, only some embodiments can be shown in the figures.

BRIEF DESCRIPTION OF THE DRAWINGS

The disclosure below is made with reference to the drawings, in which.

DETAILED DESCRIPTION

Night vision systems can include one or more different types of imaging technologies, including image enhancement/amplification anchor thermal imaging apparatus. The night vision systems discussed herein can amplify incoming visible light and/or use infrared sensors to detect differences in object temperatures. In some embodiments, the night vision systems may be configured with different modes that utilize different imaging technologies to provide users with multiple technology choices to be used by the same system.

Figure 1:
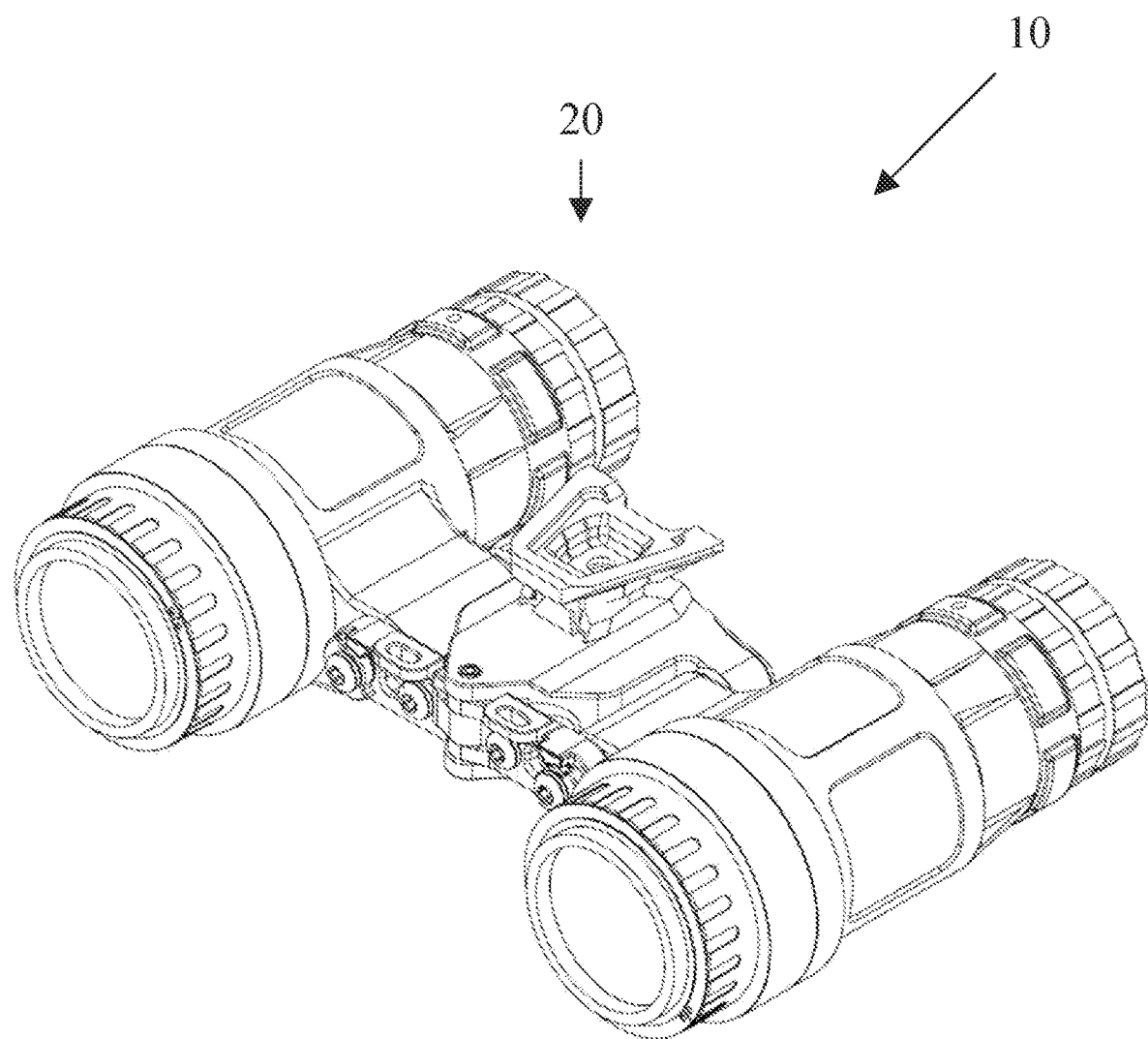
FIG. 1 is a top, right, and rear perspective view of an embodiment of a night vision apparatus in an articulated "up" position.
Figure 2:
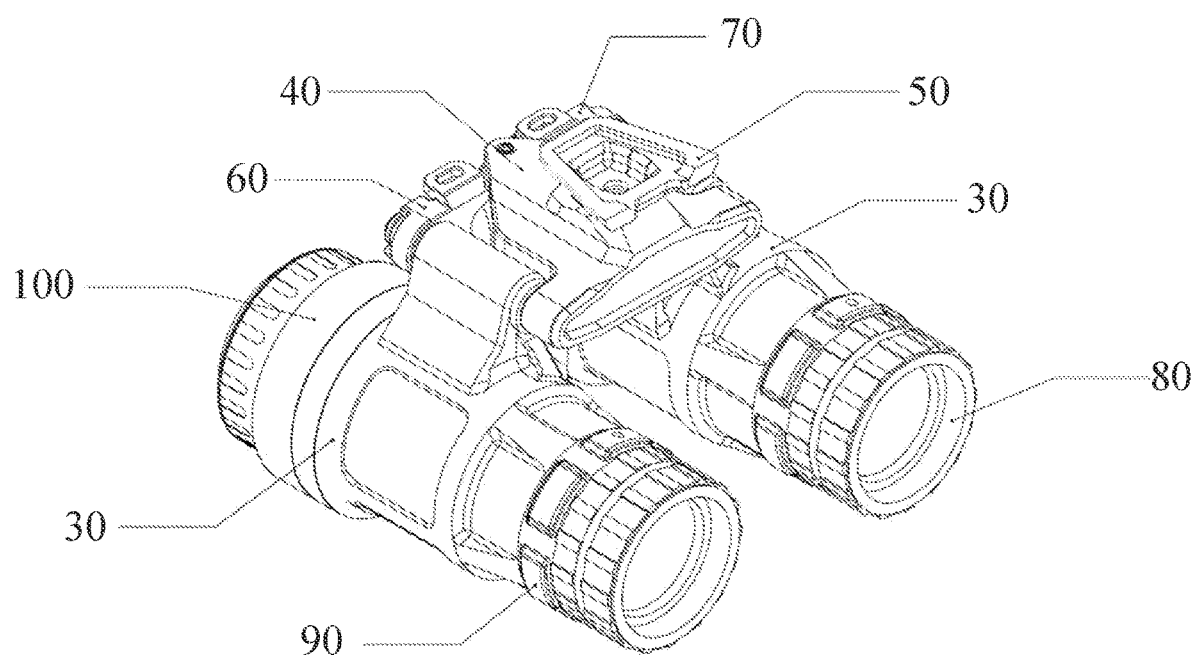
FIG. 2 is a top, right, and front perspective view of an embodiment of a night vision apparatus in an articulated "down" position.

One embodiment of a night vision system is exemplarity shown in the perspective views of FIG. 1 and FIG. 2, With reference to FIG. 1, the night vision system 10 can include a housing, generally designated with reference numeral 20. As shown by the differentiation between FIG. 1, and FIG. 2, the housing 20 can be capable of articulation. In an embodiment, the housing 20 can be articulated between at least two positions, exemplarily shown as the first position, or "up" position, shown in FIG. 1 and the second position, or "down" position, shown in FIG. 2. Herein, references to "up" and "down" positions are for illustrative purposes only and convenience of the reader. By way of convenience, it is generally understood that rotation into the "down" position is the functional equivalent to rotating into the active viewing position.

The housing 20 of the night vision system 10 can include one or more pods 30, which may also be known as image tube housings 30. Although it is generally desirable to rotate both pods into the same position (e.g. both in the "down" active viewing position) for use with both eye, each of the pods is configured to rotate or actuate independently of another pod 30, such that a user may use only one eye if desirable. By way of one illustrate example, a user may utilize a night vision system 10 that includes two pods 30 that utilize different night vision technologies, and said user may wish to utilize only one technology available in one pod, which independent pod actuation will permit. The pods 30 may require power, as discussed below, and can be configured to receive power upon rotation into the active viewing position. By way of example, in an embodiment, the pod 30 can include a magnet 310 (FIG. 17) that can cooperate with a reed switch located elsewhere on or in the housing 20, such that, with actuation of the pod 30 into the active viewing position, the magnet is brought within close proximity of the reed switch such that the circuit is completed, and power is provided to the pod 30 and components thereof. By way of example, in one embodiment, the corresponding reed switch can be located within the bridge 40, discussed below. Alternatively, a magnet may be located in the bridge 40 and a reed switch may be disposed in a pod 30 to achieve the same completed circuit effect when the pod 30 is actuated into the active viewing position.

As shown in the various figures, the night vision system 10 can include a bridge generally shown as reference numeral 40. The bridge 40 is disposed between and connects two pods 30, wherein each of the pods 30 may be identical or different, as exemplarily discussed above. The bridge 40 also provides a means of attachment to a user's helmet. Specifically, the night vision system 10 can be attached to a user's helmet by way of a mounting interface or helmet mount 50 located on the top of bridge 40. The helmet mount 50 can be shaped, configured, or arranged to facilitate cooperation with user's intended helmet and the geometry and features of the helmet mount shown in the figures are not necessarily meant to be limiting. The helmet mount 50 may include a threaded bore, dovetail interface, ball mount, rail or other means by which to attach or engage with a corresponding connector on the user's helmet to securely attach the night vision system 10 to the user's helmet (not shown).

Referring again to pods 30, the night vision system 10 can include pod retention flanges 60 and 70 to secure and retain the pods 30 on the night vision system 10. Each of the pods 30 can also include an objective lens 80. The objective lens 80 is configured to capture light received from the surroundings, which is then transmitted to an image intensifier tube within the pod 30, wherein the light is amplified as is understood in the art. The pods 30 can include an objective lens stop ring 90 to limit travel of the objective lens within the travel wherein the objective lens reaches focus. Each of the pods may also include an ocular lens assembly 100, with which a user interacts in order view through the night vision system 20, In some embodiments, the ocular lens assembly 100 may be capable of magnifying and/or focusing the image for the user to view.

Figure 3:
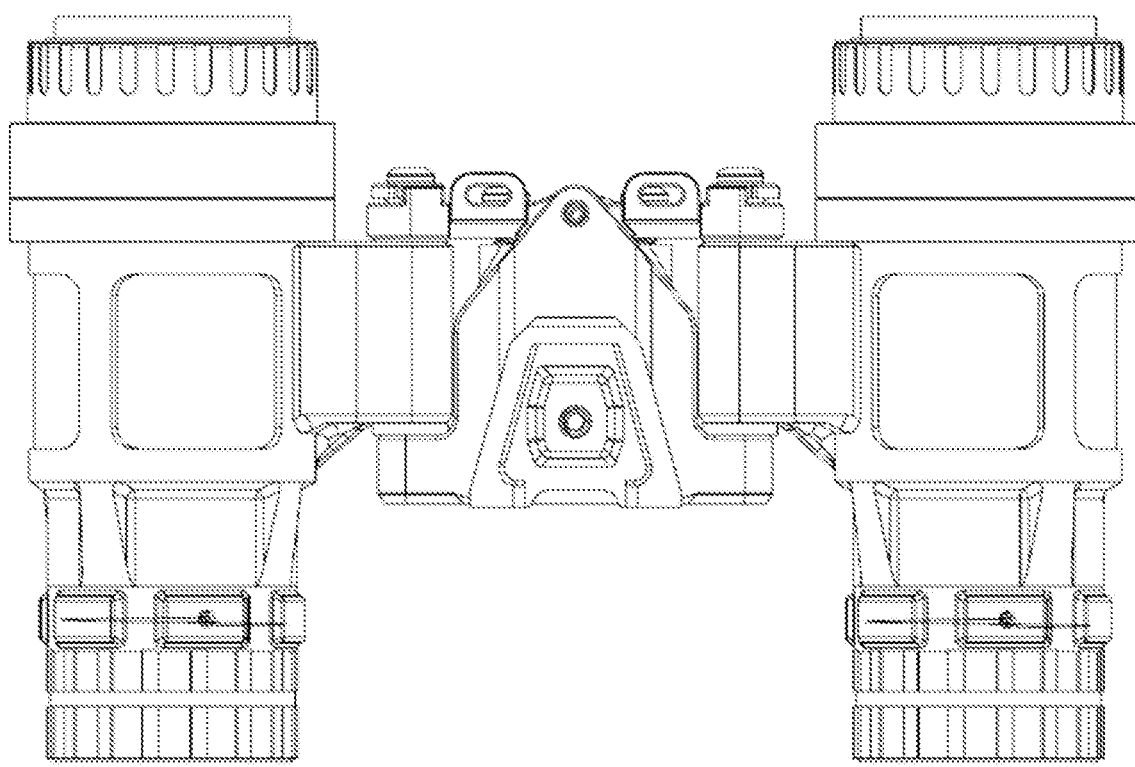
FIG. 3 is a top view of an embodiment of a night vision apparatus in an articulated "up" position.
Figure 4:
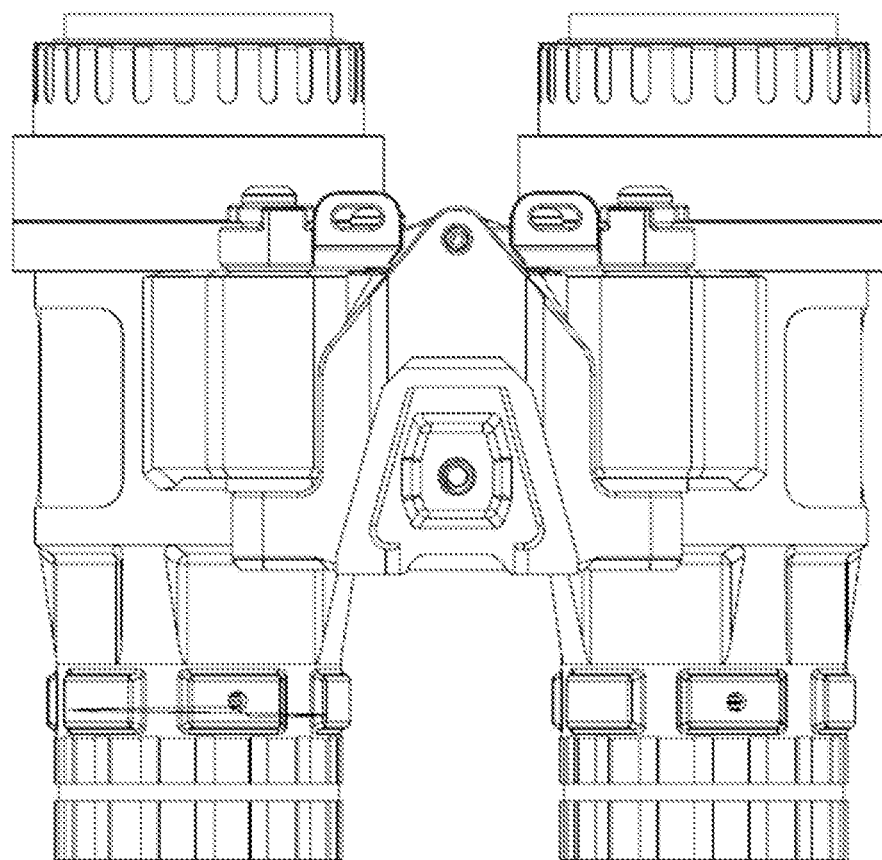
FIG. 4 is a top view of an embodiment of a night vision apparatus in an articulated "down" position.
Figure 5:
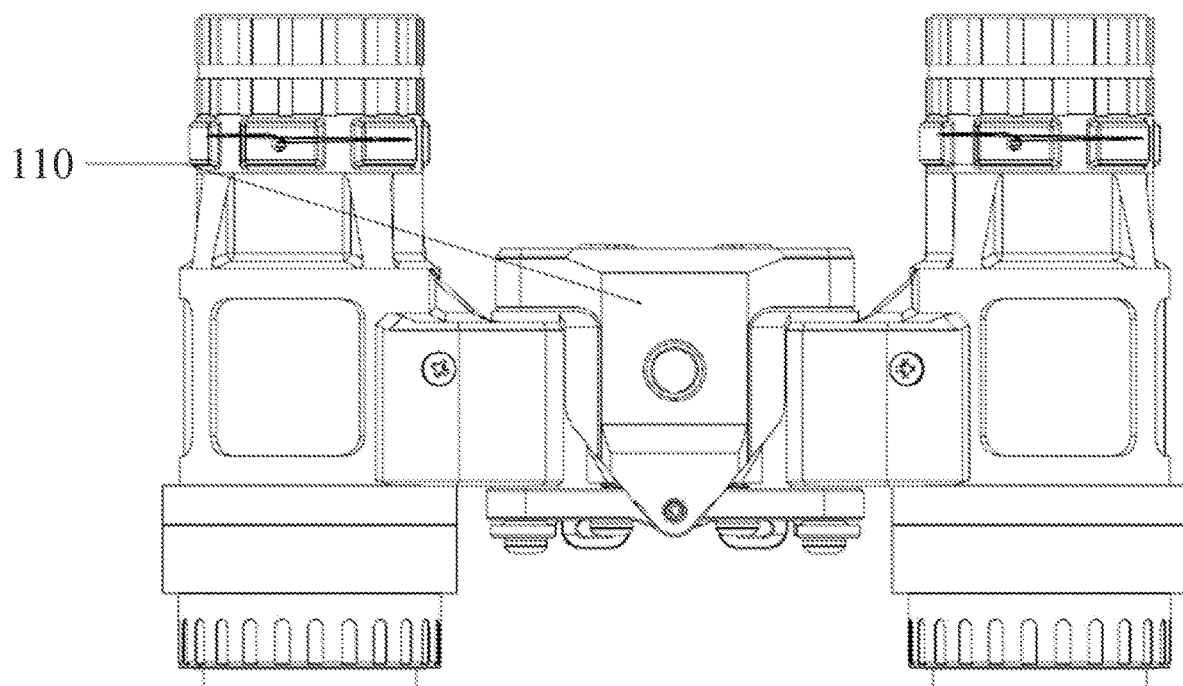
FIG. 5 is a bottom view of an embodiment of a night vision apparatus in an articulated "up" position.
Figure 6:
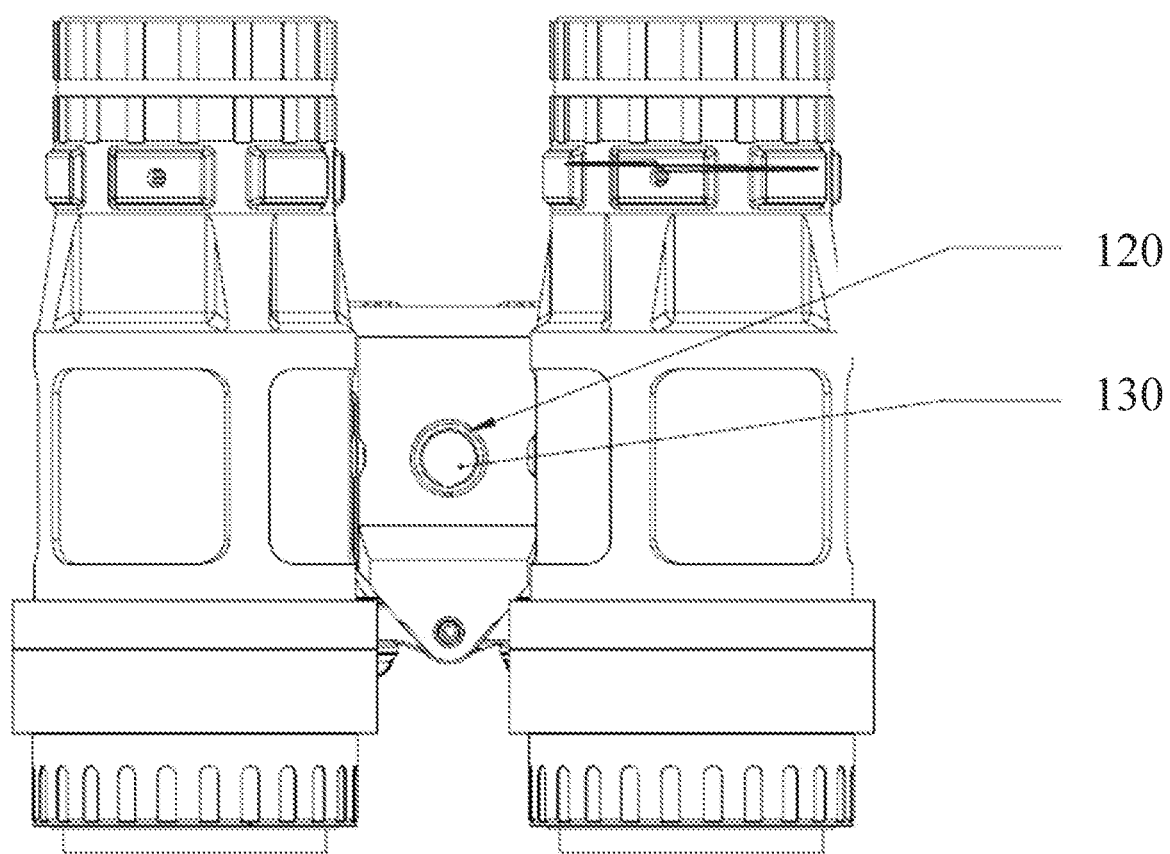
FIG. 6 is a bottom view of an embodiment of a night vision apparatus in an articulated "down" position.
Figure 7:
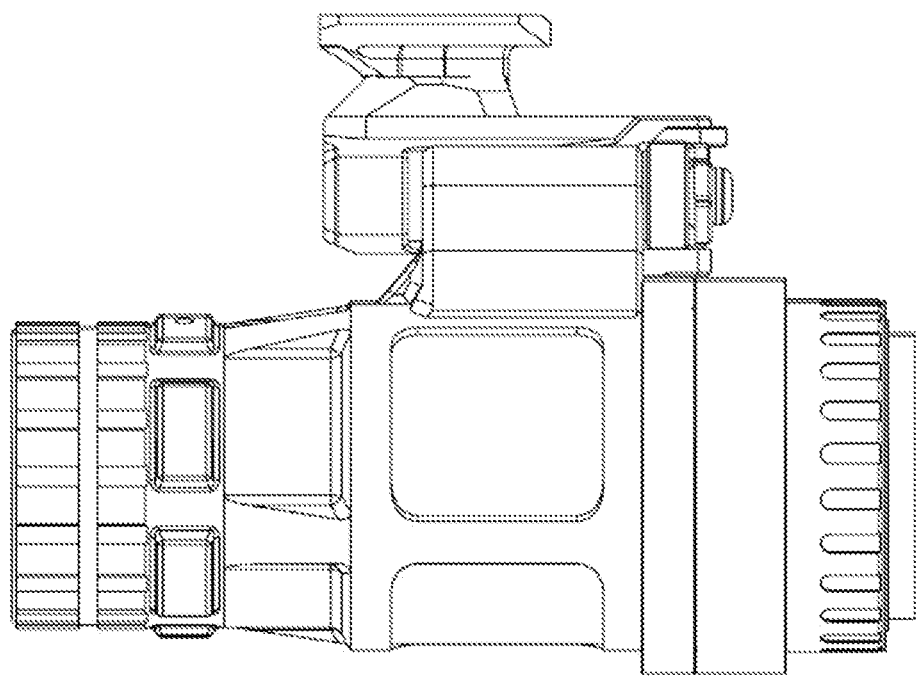
FIG. 7 is a left side view of an embodiment of a night vision apparatus in an articulated "down" position.
Figure 8:
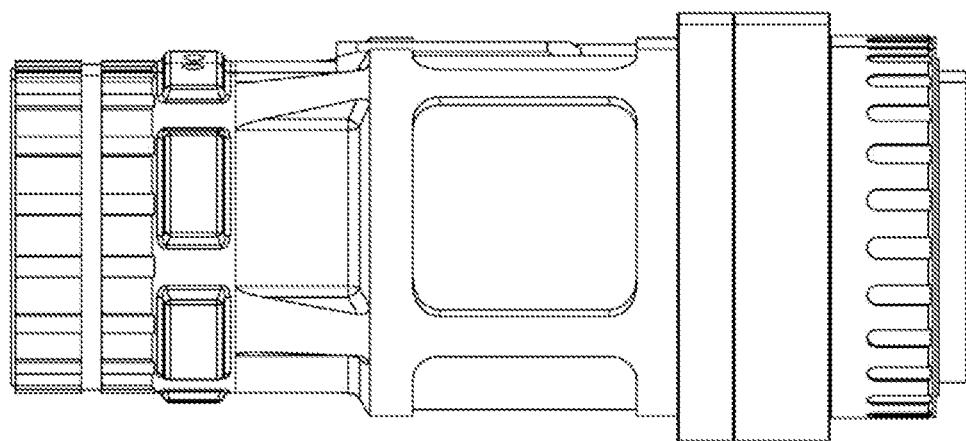
FIG. 8 is a left side view of an embodiment of a night vision apparatus in an articulated "up" position.
Figure 9:
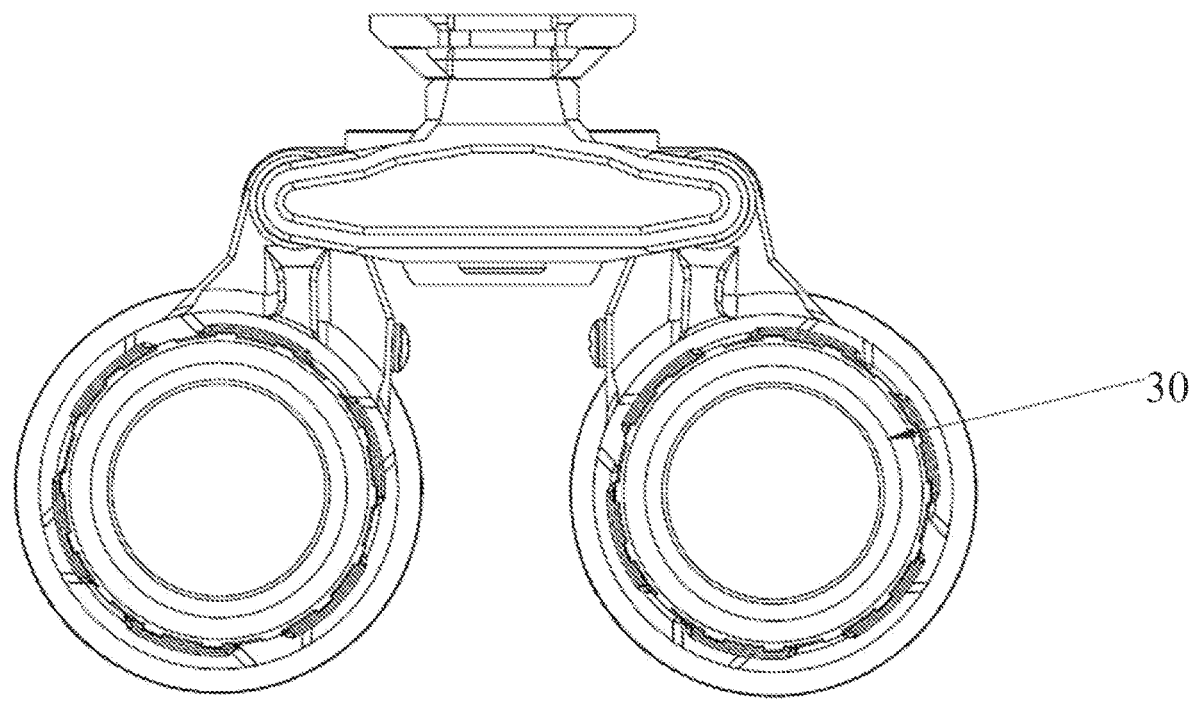
FIG. 9 is a front view of a night vision apparatus in an articulated "down" position.
Figure 10:
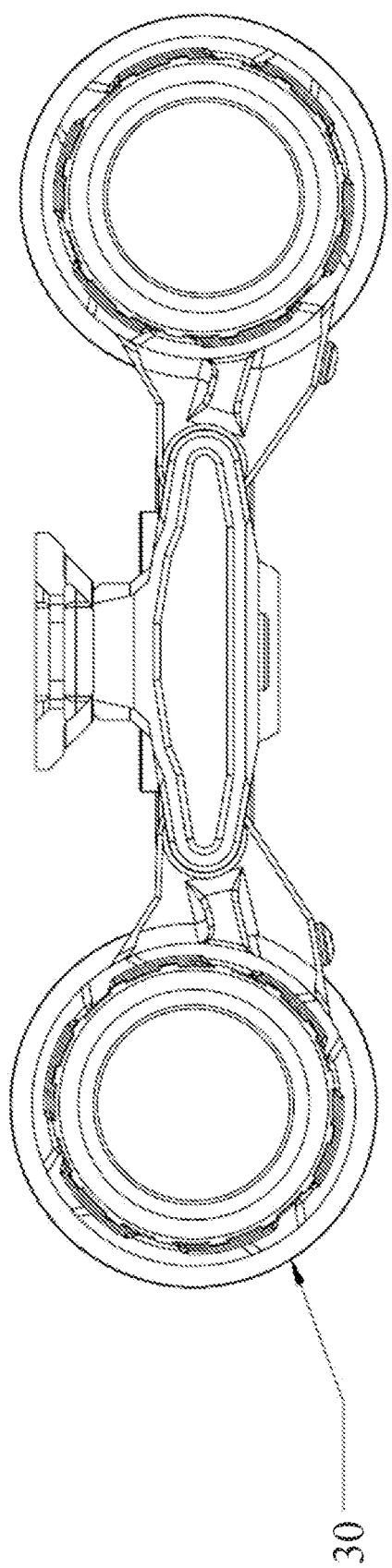
FIG. 10 is a front view of an embodiment of a night vision apparatus in an articulated "up" position.

Additional views of the night vision system 10 and housing 20 are shown in FIG. 3 (top view, articulated up); FIG. 4 (top view, articulated down); FIG. 5 (bottom view, articulated up); FIG. 6 (bottom view, articulated down); FIG. 7 (left side view, articulated down); FIG. 8 (left side, articulated up); FIG. 9 (front view, articulated down); and FIG. 10 (front view, articulated up).

Figure 11:
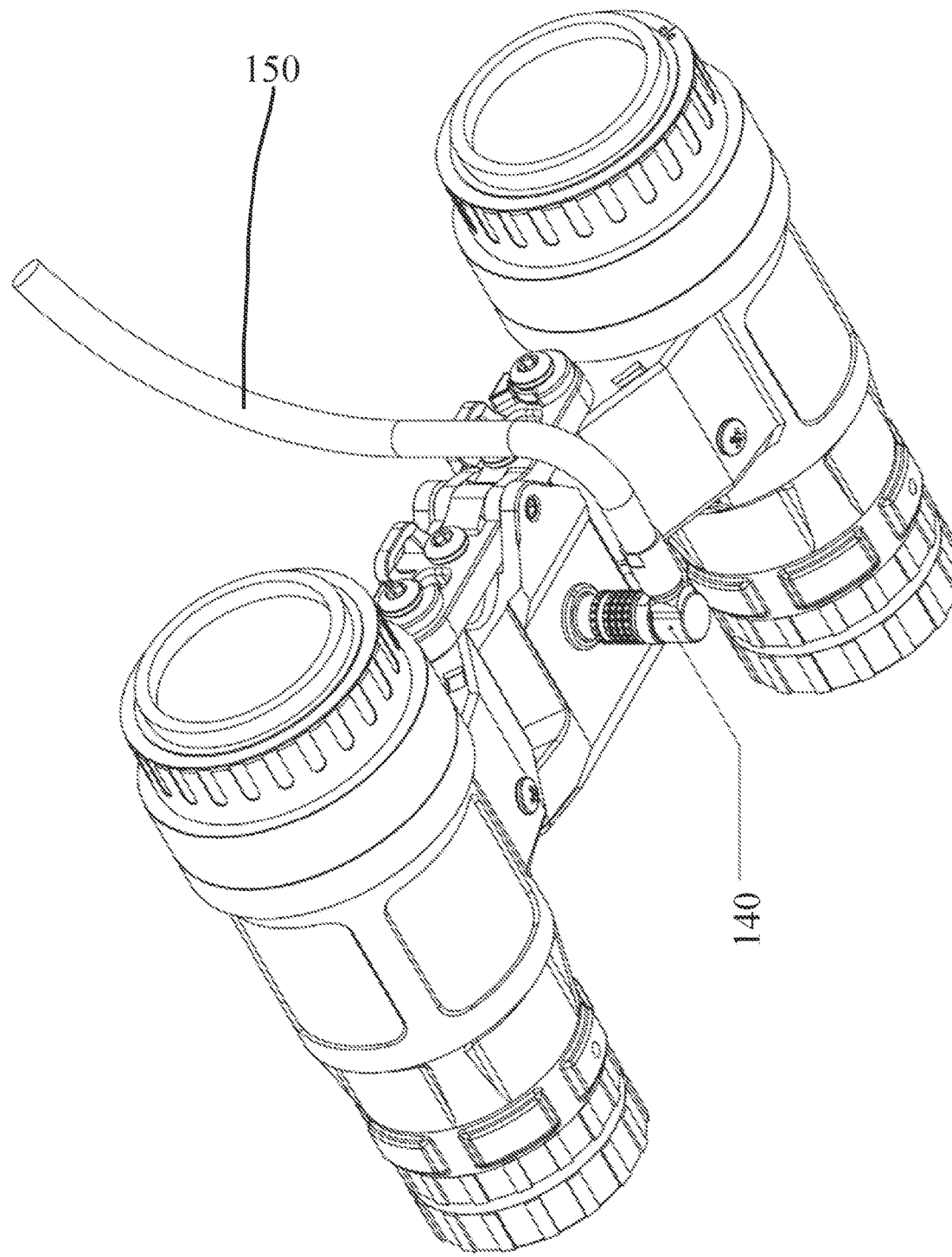
FIG. 11 is a bottom, left, and rear perspective view of an embodiment of a night vision apparatus in an articulated "up" position.

Referring to FIG. 5 and FIG. 6, the bottom of the housing 20 can include a bottom surface designated generally by reference numeral 110. The bottom surface can include a recess or receptacle 120, which is configured to receive a power and/or control connector within the receptacle bore 130. As shown in FIG. 11, a connector 140 may be removably disposed within the receptacle 120 located on the bottom of the housing 20. The connector 140 may be further coupled to a cable 150, where said cable may extend to a battery and/or control pack 200, discussed below.

The connector 140 can have 1 to 20 pins. In an embodiment, the connector 140 includes 4 to 6 pins. The connector 140 can serve as an interface between the receptable 120 and cable 150, wherein connector 140 facilitates power and/or control of various features of the night vision apparatus, including but not limited to variable gain control, screen brightness, sensor sensitivity, output level, illumination on/off, illumination brightness/intensity, main power supply on/off, auxiliary power supply on/off, screen output options, screen color, heads up display options, device settings, etc.

In some embodiments, the battery and/or control pack 200 may not be connected to the housing 20 in a tethered manner, such that cable 150 may be removable or may not exist on some embodiments. In such embodiments, connector 140 and receptacle 120 may also have different geometries to accommodate and incorporate a wireless or Bluetooth dongle or connector that can provide remote control to the night vision apparatus 10.

Figure 12:
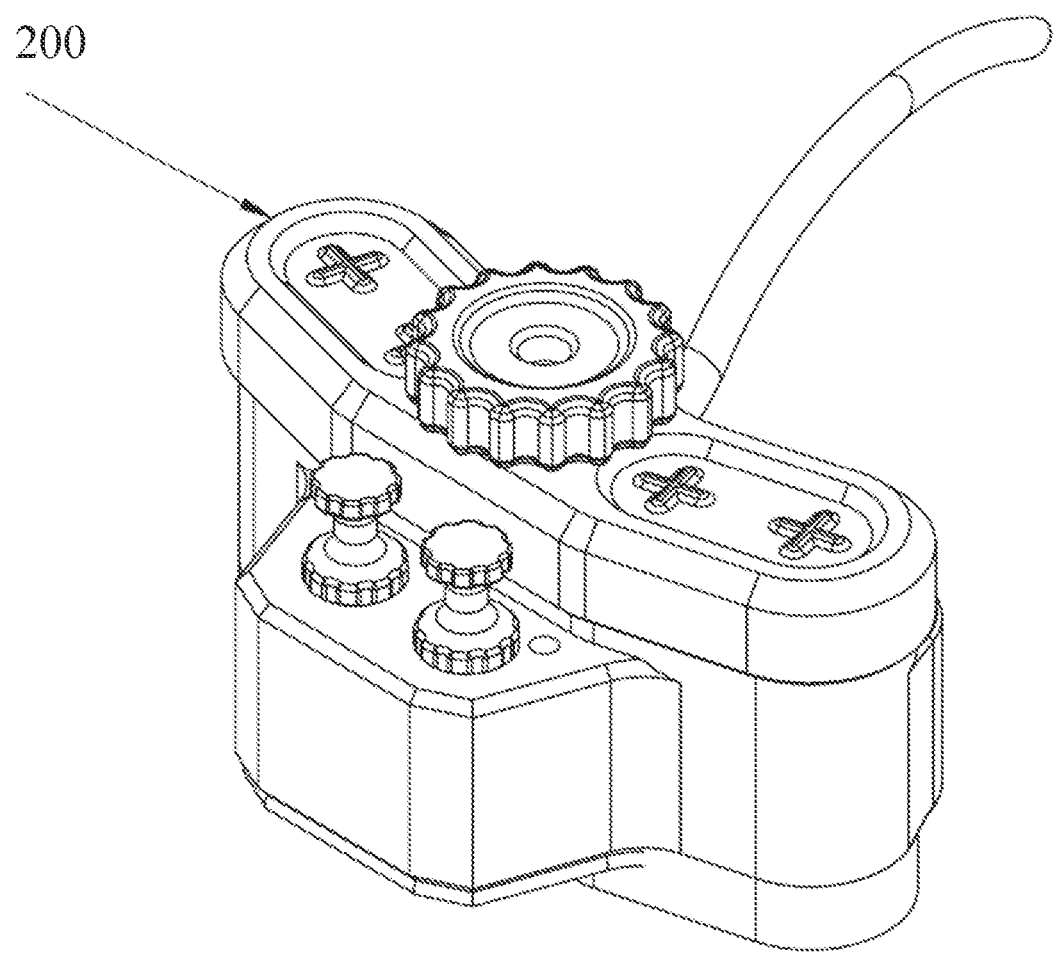
FIG. 12 is a rear and top perspective view of a power assembly to be used with an embodiment of a night vision.

Referring now to FIG. 12, the night vision system may include a battery and/or control pack 200 that can be utilized with the housing 20. In an embodiment, the pack 200 is designed to be worn on the rear of a user's head, such that the rear side shown in FIG. 12 is facing the user's rear. Accordingly, the curvature of the pack 200 can be configured to "hug" or mimic the rounded features of the back of the user's head, to permit comfortable and efficient mounting. In some embodiments, the pack 200 may also include one or more straps, adhesive, or other connecting means (not shown).

Figure 13:
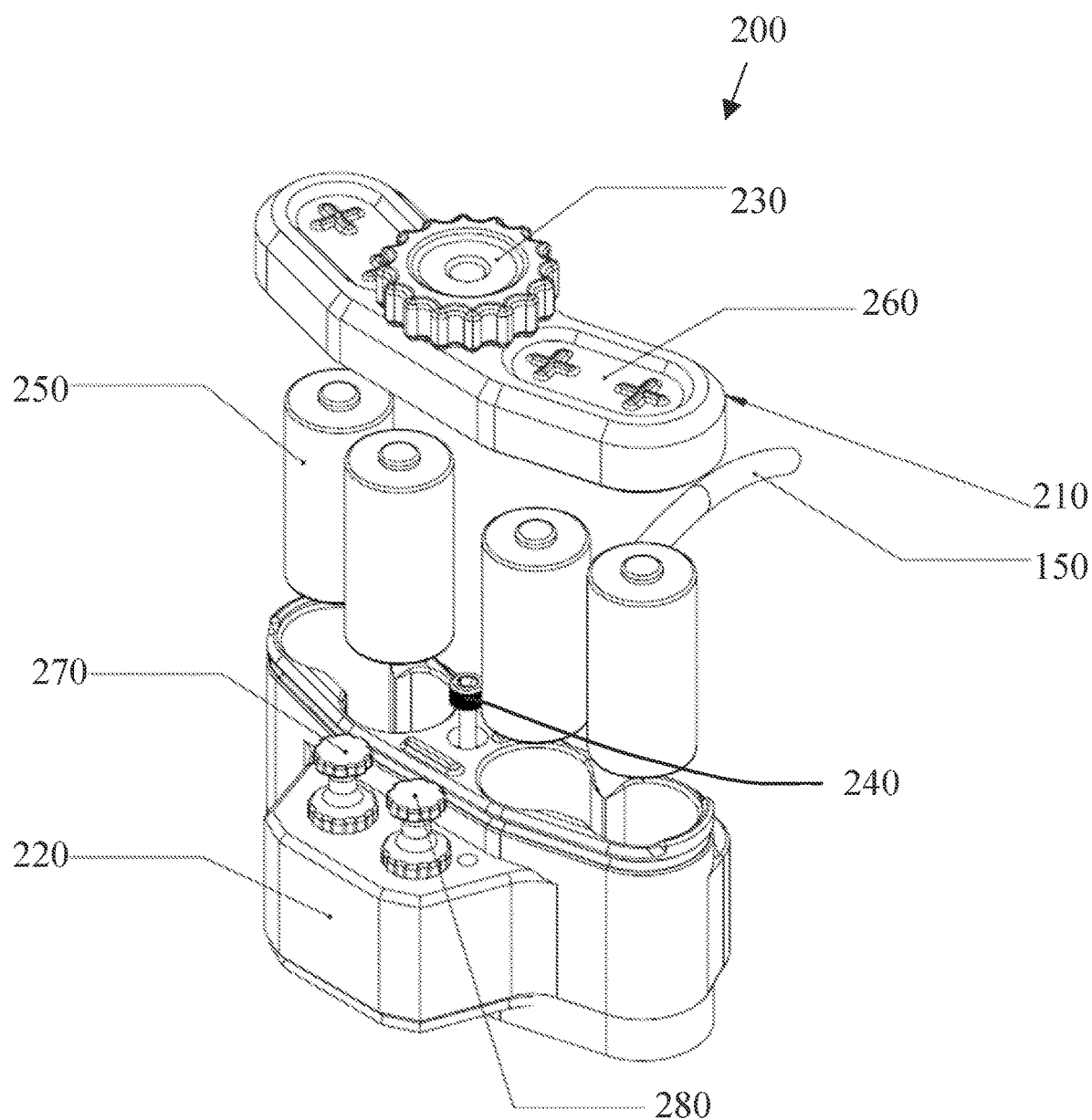
FIG. 13 is a semi-exploded perspective view of the power assembly shown in FIG. 12.

Referring now to the semi-exploded view of FIG. 13, the pack 200 can include an upper pack housing 210 and a lower pack housing 220. The upper pack housing 210 and lower pack housing 220 can be securely and releasably attached to one another by way of a fastening or connecting mechanism, such as a bolt, screw, or pin. In FIG. 13, the fastening mechanism includes a gear-shaped knob 230 disposed adjacent to the upper pack housing 210 and a shaft 240 disposed within the lower pack housing 220, such that the knob 230 and shaft 240 mate and knob 230 rotates, thereby connecting the upper pack housing 210 to the lower pack housing 220.

As exemplarily shown in FIG. 13, one or more batteries 250 can be disposed between the upper pack housing 210 and the lower pack housing 220. The barriers 250 can be one or more of various types, including CR123A, AA, AAA, 18350, 16350 or rechargeable (e.g. lithium). In an embodiment of the night vision system 10, the batteries 250 supply between 1 and 6 volts of power. This power can be utilized by the pack to power remote control functions or can be transmitted via the cable 150 (in embodiments having said cable 150) to the housing 20 to power components within and/or on the housing 20. As also seen in FIG. 13, the housing can include indicia 260 (e.g. plus or positive signs) to assist the user with proper orientation of the batteries within the housing.

In an embodiment, the pack 200 can control the resistance value of an auxiliary input/output from the attached cable 150. An analog potentiometer or digital controller can be integrated into the body of the pack 150 to adjust resistance. The pack 200 can include one or more switches 270, 280 to control main output power supply and/or secondary and/or tertiary auxiliary power outputs and controls. In some embodiments, the pack 200 may include no switches, one switch, two switches, or more than two switches. The switches 270, 280 can be configured to control variable gain control, screen brightness, sensor sensitivity, output level, illumination on/off, illumination brightness/intensity, main power supply on/off, auxiliary power supply on/off, screen output options, screen color, heads up display options, device settings, etc. The switches 270 and 280 can be provided in one of several form factors, including the knobs shown in FIG. 12, The switches 270 and 280 need not necessarily have the same form factor.

Figure 14:
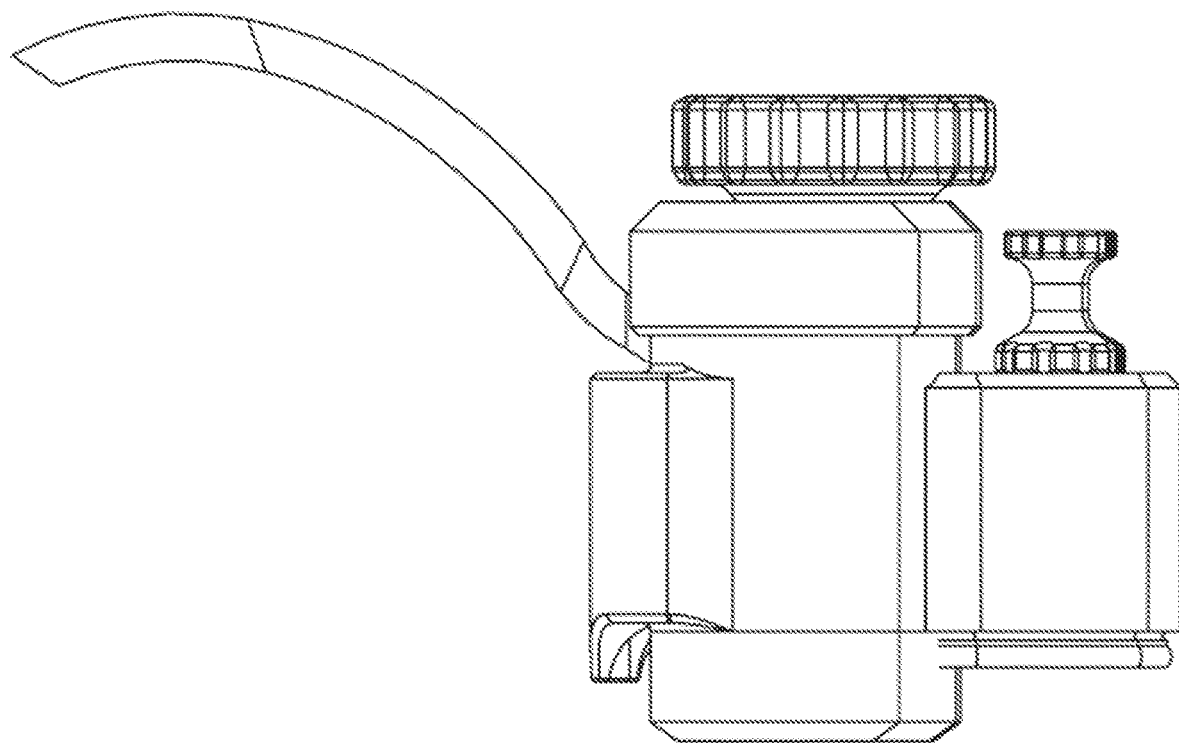
FIG. 14 is a side view of the power assembly shown in FIG. 12.
Figure 15:
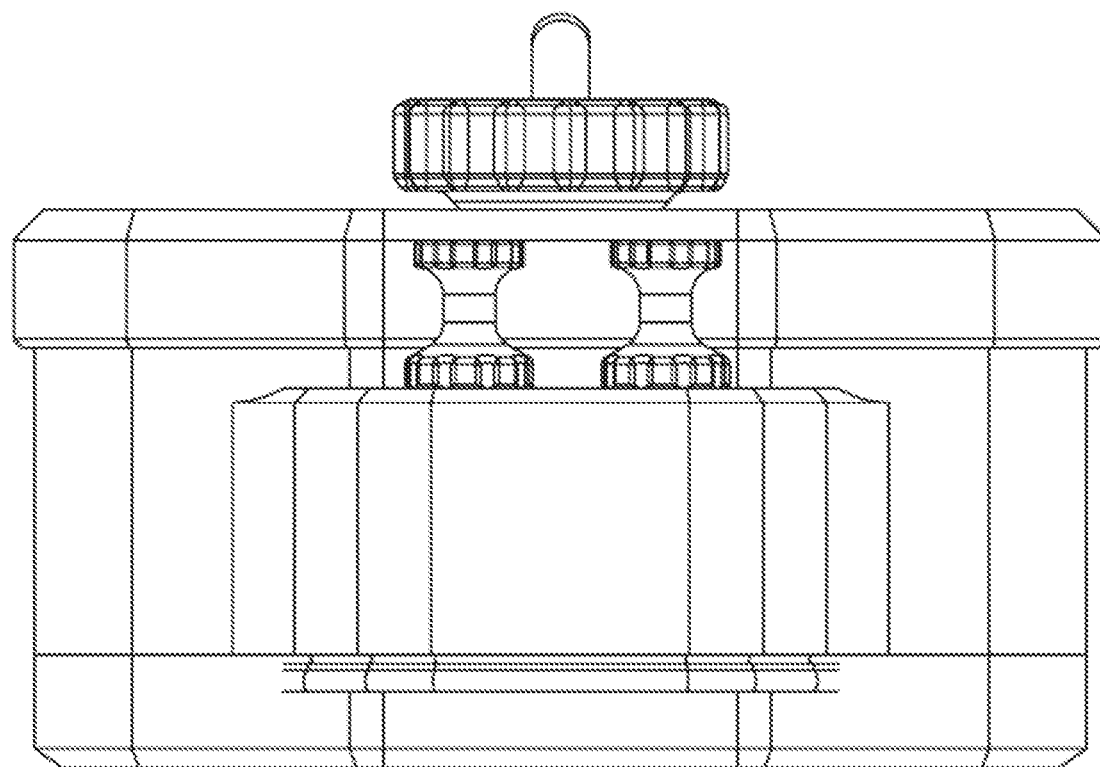
FIG. 15 is a rear view of the power assembly shown in FIG. 12.
Figure 16:
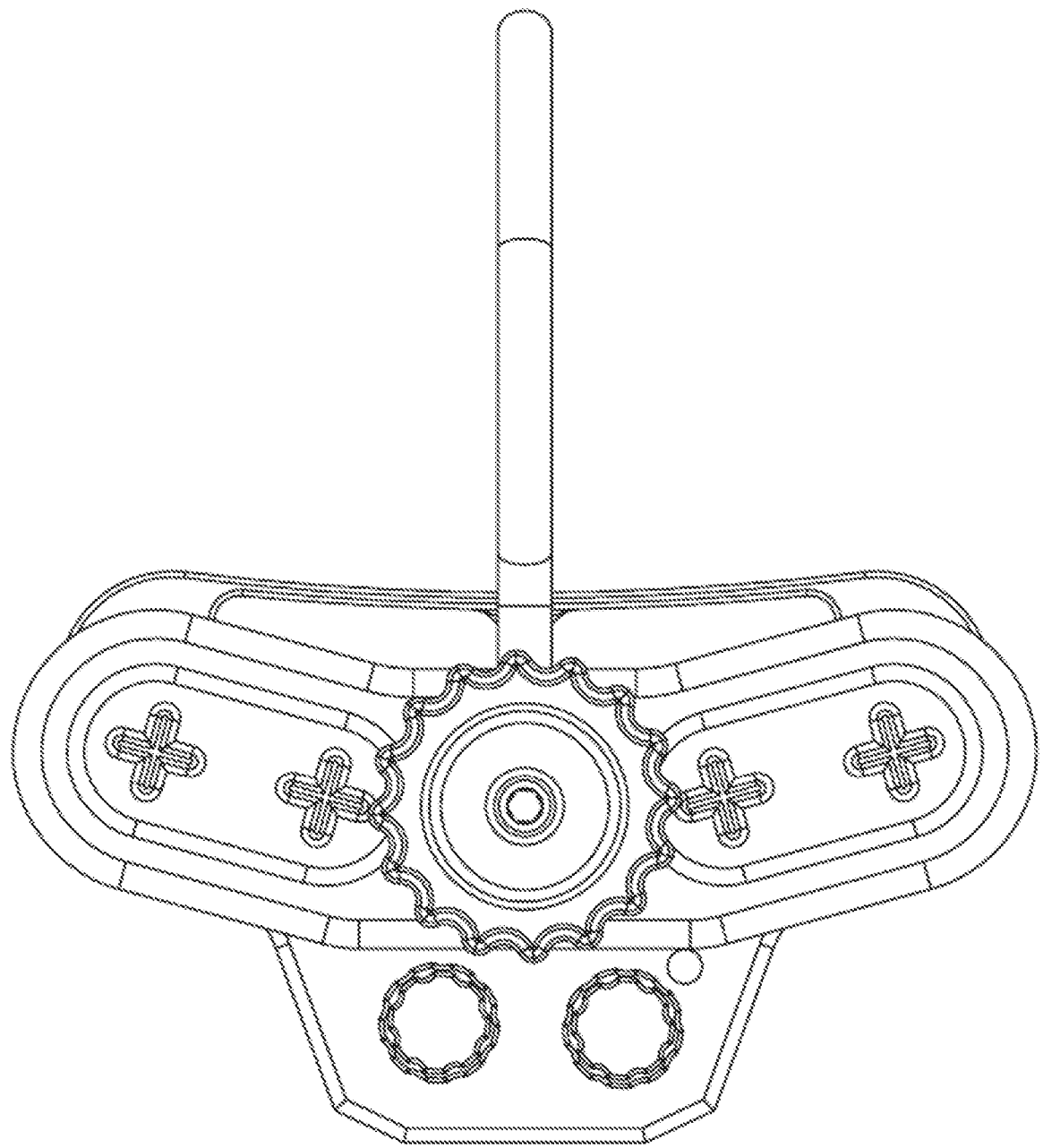
FIG. 16 is a top view of the power assembly shown in FIG. 12.

FIG. 14 (side view), FIG. 15 (rear view), and FIG. 16 (top view) show alternate views of the pack 200, including the arcuate surface or curvature designed to cooperate comfortably with the rear of the user's head. As discussed above, not all embodiments include the cable 150 and these views similarly can incorporate a removable cable 150 or the cable 150 can be excepted from the embodiments.

Figure 17:
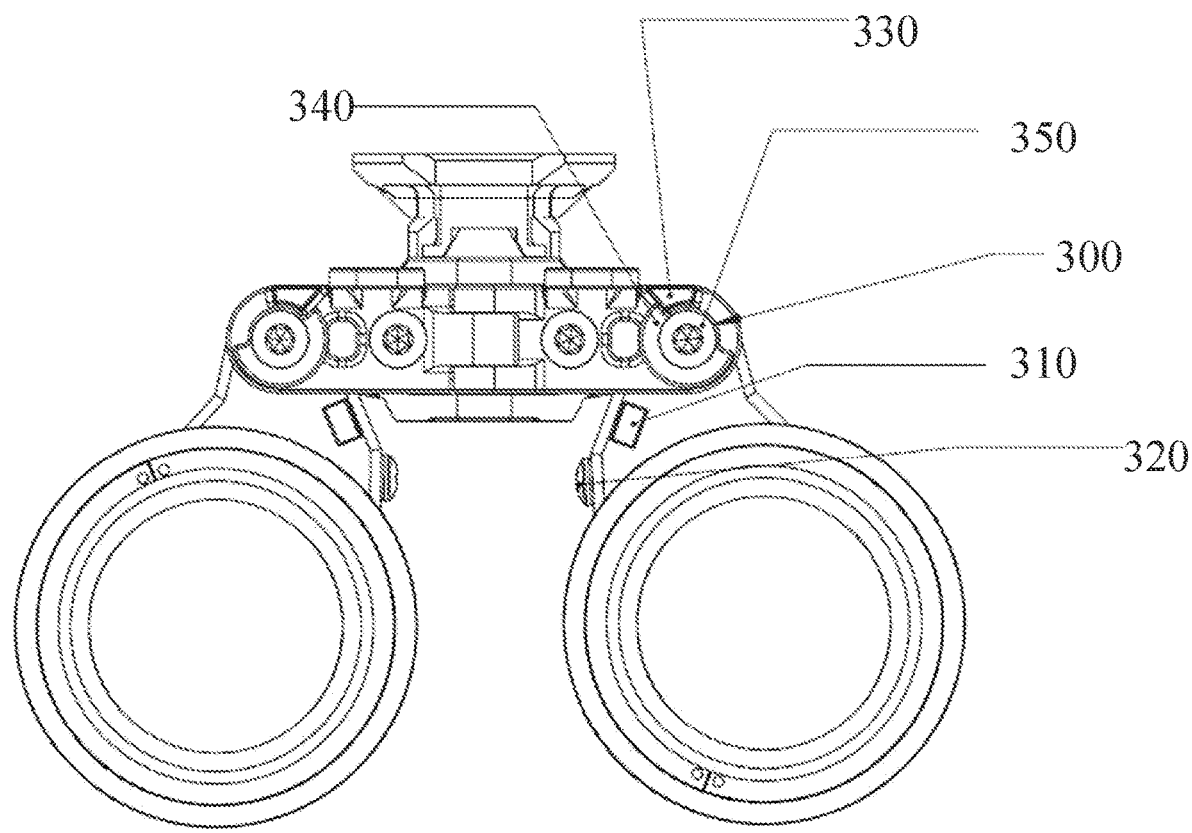
FIG. 17 is a rear view of an embodiment of a night vision apparatus in an articulated "down" position.
Figure 18:
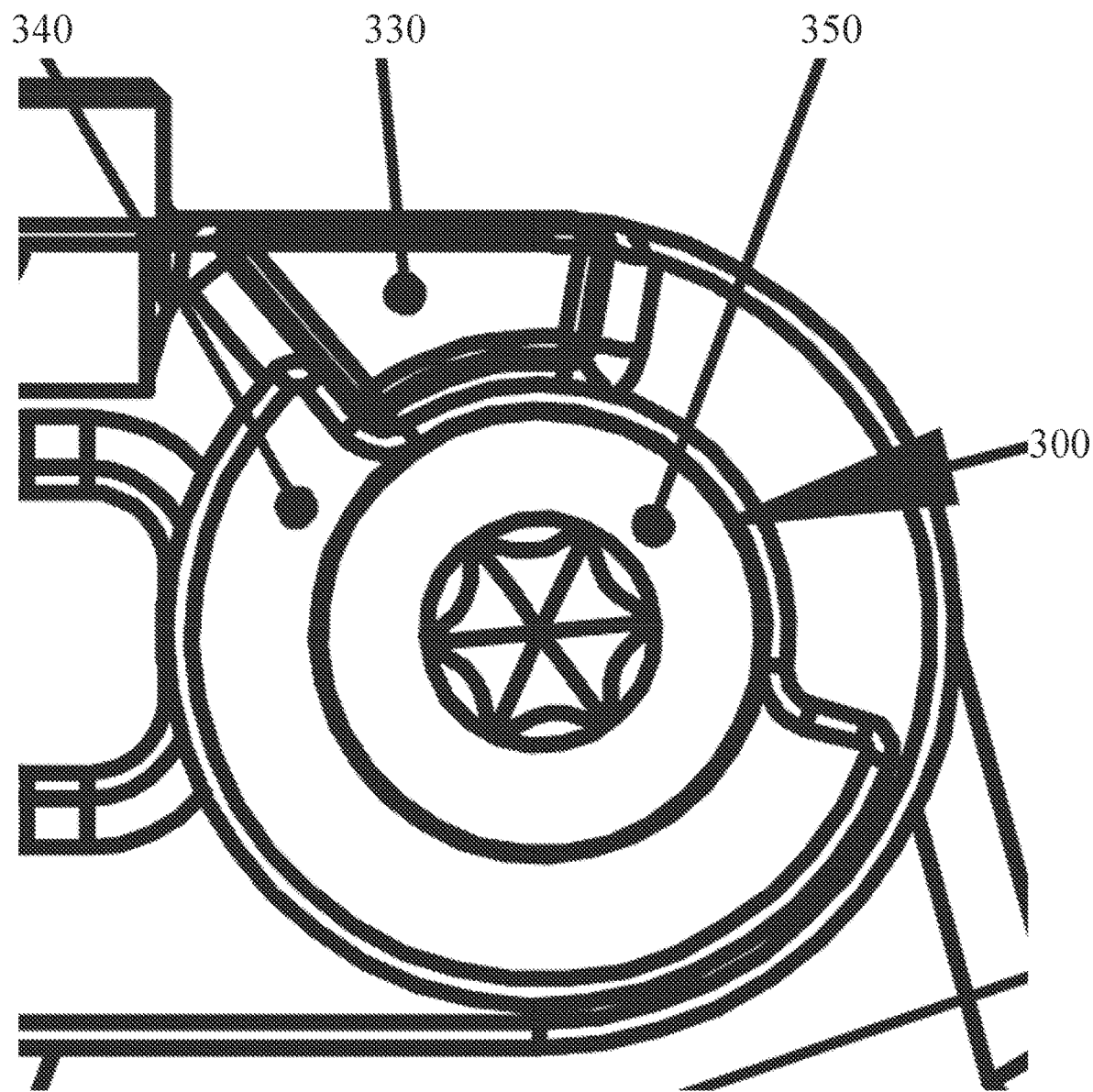
FIG. 18 is close-up view of a portion of the night vision apparatus shown in FIG. 17.

Referring now to FIG. 17 and FIG. 18, embodiments of the night vision system 20 can include features to quickly and efficiently accommodate various user's interpupillary distance, or the distance between the user's eyes (pupils) and the binocular optic components of some embodiments of the night vision system 10. If the interpupillary distance is not properly set, the user will experience distorted images when utilizing the system 10.

As shown in FIG. 17, embodiments of the night vision apparatus 10 include an interpupillary feature generally shown as reference numeral 300. The interpupillary feature 300 can be located near the magnet 310 located in the pods 30 and/or located near the purge port and screw 320. The interpupillary feature can include primarily three components to set the interpupillary distance: a stop feature 330, a rotating interpupillary disk 340, and a tensioning screw 350. The stop feature 330 can include a raised surface, protrusion or nub. The rotating interpupillary disk 340 is configured to rotate with and when the respective pod 30 is rotated towards the up or down positions. The tensioning screw 350 is configured to retain the rotating interpupillary disk 340.

In practice, rotation of the pod 30 to the down position causes the interpupillary disk 340 to rotate about its central axis. Upon full desired rotation, the interpupillary disk 340 contacts and is stopped by stop feature 330, as shown in FIG. 17 and FIG. 18, As a result, the pods 30 cannot be rotated further downward without significantly increased force, and the distance between such pods is therefore set to a reproducible distance. The tensioning screw 350 can be tightened or loosened to modify the amount of required force to be applied to rotate the interpupillary disk to the desired stop point. The tensioning screw 350 can also be tightened or loosened to change the amount of force needed to rotate in the opposite direction when the pods are actuated to the "up" position in order to reset them.

Although not necessarily fully illustrated in the specific embodiments shown in the figures attached hereto, embodiments of the night vision apparatus referenced in this disclosure can include monocular, binocular, biocular, triocular, tinocular, quadocular, or quadnocula systems. Embodiments described herein may be combined in a novel and inventive way to provide advantages that were not previously observed in the art. This disclosure should not necessarily be interpreted to be limited to only the embodiments shown and described, as embodiments described may appear differently than as shown, and drawings shown may be understood differently than as described.

What is claimed is:

1. A night vision system comprising:
   a first rotatable night vision image tube housing;
   a first arcuate interpupillary disk rotatably coupled to the first rotatable night vision image tube housing;
   first arcuate interpupillary stop configured to cooperate with the first arcuate interpupillary disk;
   a second rotatable night vision image tube housing;
   a second arcuate interpupillary disk rotatably coupled to the second rotatable night vision image tube housing; and
   a second arcuate interpupillary stop configured to cooperate with the second arcuate interpupillary disk.

* * * * *